UNITED STATES PATENT OFFICE.

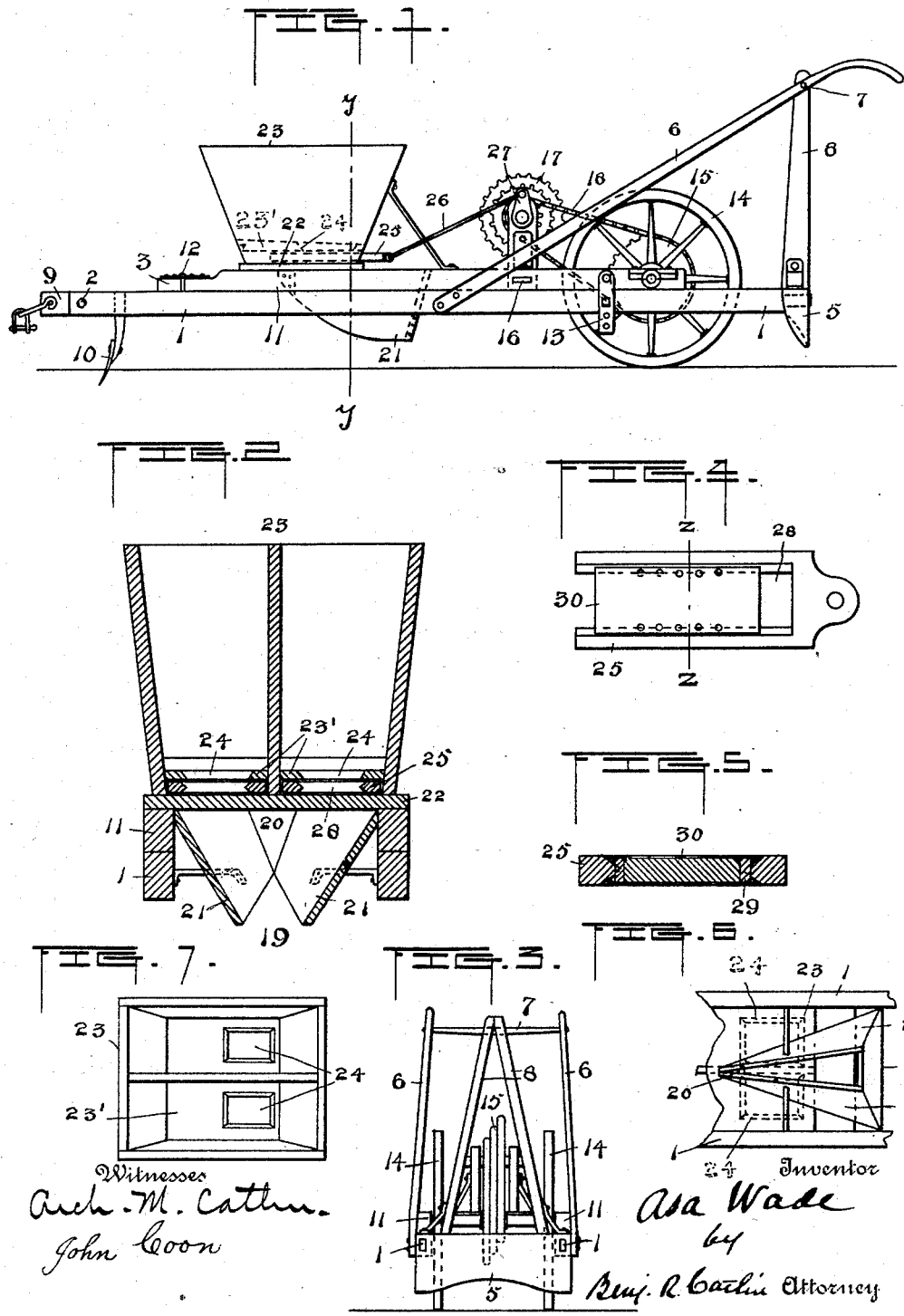

ASA WADE, OF McCOOL, MISSISSIPPI.

SEED-PLANTER.

SPECIFICATION forming part of Letters Patent No. 524,474, dated August 14, 1894.

Application filed January 15, 1894. Serial No. 497,006. (No model.)

*To all whom it may concern:*

Be it known that I, ASA WADE, a resident of McCool, in the county of Attala and State of Mississippi, have invented certain new and useful Improvements in Seed-Planters; and I do hereby declare the following to be a full, clear, and exact description of the invention, such as will enable others skilled in the art to which it pertains to make and use the same.

The invention relates to seed planters and has for its object to increase the efficiency, certainty of action and relative economy of manufacture in such machines, and it consists in the construction hereinafter described and particularly pointed out.

In the accompanying drawings Figure 1 is a side elevation. Fig. 2 is a section on line y—y of Fig. 1. Fig. 3 is a rear end elevation. Fig. 4 is a plan of a slide. Fig. 5 is a section on line z—z of Fig. 4. Fig. 6 is a partial bottom plan. Fig. 7 is a top plan of the main seed hopper.

Numeral 1 denotes the side pieces of a main frame secured together by bolt 2, cross bar 3 and by the covering and smoothing cross bar 5. The side bars 1 are further joined indirectly by the handles 6 secured thereto and to each other by rod 7 which rod is made fast in the posts 8 attached to the covering and smoothing bar 5.

9 denotes a draw bar fastened by said bolt 2 and cross bar 3 to the side bars as shown. In this draw bar is secured a seed-furrow opener or shovel 10.

11 denotes the side bars of a supplemental frame which is hinged at 12 to the cross bar 3 of the main frame. This hinged connection is situated at the end of the supplemental frame and between the furrow opener and the wheels whereby the weight of the hinged frame and its attached devices is more evenly divided between the furrow opener and the wheels. The handles are also attached to the main frame at points about midway between the furrow opener and the wheels and near the center of gravity of the planter whereby the furrow opener and the seed guides 21 can be easily raised from the ground by using the handles as levers and the plate 5 as a fulcrum. The latter plate has a curved lower edge adapted to leave the surface of the planted row slightly rounded for the shedding of rain.

13 denotes devices for adjustably securing the rear end of the supplemental to the main frame. The reason for the adjustment of the upper frame is found in the fact that it supports the wheels 14 which latter run one on each side of the seed furrow and keep the frames above the ground and so modify the action of the smoothing bar 5 by determining its situation with respect to the surface soil thrown up by the furrow opener.

Between the wheels and fixed on their shaft is a cone pulley 15. Cross bar 16 which holds together the side bars of the hinged frame supports a corresponding cone pulley 17 cooperating with that first named by means of a chain or belt 18.

19 denotes a seed and fertilizer chute and seed coverer and consists of a front 20 and side plates 21. Both the back and sides are made fast to the hinged frame and the front ends of the sides are secured to the platform 22 on which is secured the seed box which platform is made fast to said frame substantially as indicated.

The view in Fig. 2 looks toward the front of the machine and shows the front 20 of the seed guiding and sod clearing device as a triangular piece and the inclined side plates as trapezoidal figures. These plates are shown in side elevation in Fig. 1. They incline outwardly toward their top and rear, but approach each other at the front and are there joined by the plate 20. By this construction the bottom edges of the side plates extend obliquely across and are adapted to move along the crests of the two ridges formed by the opener.

The bottom edges of the side boards or plates 21 and the front 20 may be steel shod as also may the bottom edge of the smoother 5. These sides are inclined inwardly toward the ground and their lower edges are upwardly inclined toward the front as stated and their construction and arrangement are such that they both guide the seed and fertilizer if that is used into the furrow and throw sidewise and away from the furrow sods, clods or stones lying near the same.

The bottom of the front 20 may be used to spread the crest of the ridge formed by the furrow opener and thereby cover the seed, though this function will in general be performed by the coverer 5.

23 denotes the main seed hopper which may be divided by a partition to form two compartments for seed or one for seed and one for fertilizer. At the rear of a floor 23' of each compartment is a small hopper 24 formed in said floor which latter is situated above the main floor or platform 22 to provide ways for the vibrating distributers 25. Each of these distributers or slides is connected by a link 26 to a crank arm 27 and through the medium of said arm to the shaft or pulley 17 whereby they are suitably moved back and forth to receive seed in a pocket 28 therein and move said pocket so that seed carried therein will drop over the rear of the platform or through a recess or hole therein to the ground. The size of the seed pocket is made adjustable by means of movable bottom 30 and a pin 29 entering suitable holes in the slide and bottom.

The general operation of the machine will be readily understood from the foregoing. It will be noted that the seeding mechanism and wheels are supported in the hinged frame whereby their proper relation to the surface of the ground according to its condition and the desired depth of seeding may be adjustably secured. It will be seen also that the same plates which guide the falling seed and fertilizer can be used for moving clods and the like to the side so that the scraping or smoothing action of the bar 5 will not cause them to plow into the seed furrow and disturb the seed in case such clods or obstructions are of such character that they are not broken up by bar 5 which latter not only breaks down and pulverizes friable lumps but smoothes and presses the surface in manner to prevent the too speedy drying of the same and leaves a slightly rounded and approximately level surface not liable to be moved by heavy rains to uncover the seed.

Having thus described my invention, what I claim is—

1. The combination with the main seed hopper its seed discharging devices and bottom 22, of the inwardly inclined seed guiding side plates 21 having upwardly and inwardly inclined faces and edges adapted to move obstructions to either side of the seed furrow, and the front plate 20, substantially as set forth.

2. The combination with the main seed hopper its seed discharging devices and bottom 22, of the inwardly inclined seed guiding side plates 21 having inwardly and upwardly inclined faces and edges adapted to move obstructions to either side of the seed furrow, the front plate 20, and the smoothing bar 5 having an upwardly curved lower edge said bar being vertically adjustable with respect to the wheels, furrow opener and inclined seed guiding plates by the medium of the adjustable frames, substantially as set forth.

3. The combination of the main frame provided with a furrow opener, the hinged frame provided with a seed hopper, the seed droppers, the seed guides extending below the main frame and upwardly and outwardly inclined to move sods and stones outwardly, the wheels supported to turn in said hinged frame, the cone pulley fixed to the wheel axle, the corresponding pulley supported on the hinged frame, devices connecting the shaft of the latter pulley to the seed droppers to suitably move the same, and devices for adjusting and fixing the frames together, substantially as set forth.

In testimony whereof I have signed this specification in the presence of two subscribing witnesses.

ASA WADE.

Witnesses:
R. M. WADE,
C. V. WADE.